United States Patent [19]

Hara et al.

[11] Patent Number: 4,552,576
[45] Date of Patent: Nov. 12, 1985

[54] METHOD OF FABRICATING OPTICAL GLASS BASE MATERIAL AND APPARATUS FOR FABRICATING THE SAME

[75] Inventors: Ryoichi Hara; Toshiaki Kuroha, both of Ichihara; Nobuo Inagaki, Ibaraki, all of Japan

[73] Assignees: The Furukawa Electric Co., Ltd.; Nippon Telephone & Telegraph Public Corp., both of Tokyo, Japan

[21] Appl. No.: 641,880

[22] Filed: Aug. 20, 1984

[30] Foreign Application Priority Data

Aug. 22, 1983 [JP] Japan .................. 58-152760

[51] Int. Cl.$^4$ .................. C03C 25/02; C03B 37/03
[52] U.S. Cl. .................. 65/2; 65/3.12; 65/11.1; 65/13; 65/18.2
[58] Field of Search .................. 65/2, 3.11, 3.12, 10.2, 65/11.1, 13, 18.2

[56] References Cited

U.S. PATENT DOCUMENTS 3,177,057  4/1965  Potter et al. .................. 65/13 X
4,202,679  5/1980  Cocito .................. 65/2

FOREIGN PATENT DOCUMENTS 53-19034  2/1978  Japan .................. 65/3.12
53-19036  2/1978  Japan .................. 65/3.12
55-46982  11/1980  Japan .................. 65/3.12
57-92534  6/1982  Japan .................. 65/3.12

Primary Examiner—Robert Lindsay
Attorney, Agent, or Firm—George B. Oujevolk

[57] ABSTRACT

A method of fabricating an optical glass base material by injecting and depositing fine glass particles produced by chemically reacting glass stock which comprises means for growing the fine glass particles in a depositing direction to form porous rod-shaped base material, support means for supporting the porous rod-shaped base material after growing, and heat treatment means for sintering at least the outer periphery of the rod-shaped base material in a semisintering state before supporting the rod-shaped base material by said support means to harden the same. Thus, since the rod-shaped base material is held in the stable state through the support means, the mechanical strength of the base material is strengthened strength by the semisintering hardening through the heat treating means before being supported by the support means, the base material is not deformed nor damaged in the supported state, and a large base material may be fabricated.

7 Claims, 5 Drawing Figures

METHOD OF FABRICATING OPTICAL GLASS BASE MATERIAL AND APPARATUS FOR FABRICATING THE SAME

BACKGROUND OF THE INVENTION

This invention relates to a method of and apparatus for fabricating an optical glass base material by means of a VAD method (vapor-phase axial deposition method).

The VAD method has been already used as means for fabricating glass base materials of products such as communication optical fibers, image guides, light guides, rod lenses and the like.

In the VAD know method, vapor-phase glass stock, oxygen gas, hydrogen gas, buffer gas (inert gas) and the like are supplied to a reaction burner of a multi-wall tube structure, the chemically reacted product produced through the burner in the combustion state, i.e., spot-like fine vitreous particles are injected to and deposited on a target, and porous rod-shaped base material is thus formed.

Then, the rod-shaped base material is transparently vitrified to form a preformed rod.

In the general VAD method, a target is lifted synchronously with the growing velocity of the rod-shaped base material which grows in a vertical direction, and a so-called "a vertical type" is employed, but in the case of this type, when an apparatus for depositing and forming the rod-shaped base material, an apparatus for transparently vitrifying the rod-shaped base material and further an apparatus for cutting the base material thus transparently vitrified are used so that, the entire height reaches approximately 10 m. When the optical glass base material is fabricated by such conventional apparatus, the following problems and drawback exist:

(i) Since the porous rod-shaped base material is transparently vitrified, the viscosity of the part which is lowered by the heat treatment at that time and the part cannot support the weight of the porous portion continued underneath the part, the length and the thickness of the rod-shaped base material formed by the above deposition has to be reduced, and the long and thick base material cannot be produced.

(ii) When the rod-shaped base material is thus transparently vitrified as described above, the porous rod-shaped base material is abruptly and largely shrunk in volume to decrease in the diameter and length to approximately $\frac{1}{2}$ (approximately $\frac{1}{2}$ in volume). In this case, this shrinkage of the base material occurs irregularly due to the irregular density of the porous rod-shaped base material and to the irregular temperature distribution at the transparently vitrifying time, and bending occurs between the transparently vitrified part and the porous part of the base material.

When such a bending takes place in the base material, the grown end (lower end) of the rod-shaped base material is displaced from the center of the deposited position, and a fluctuation occurs in the base material of rotating state. Accordingly, the fabricating conditions for obtaining a high quality base material are disorganized.

(iii) Since the entire apparatus has a great height such as 10 m, its driving operations are difficult, and it is necessary to provide a remedy against the safety factor of the apparatus in view of the structural strength, and its housing should accordingly be large in size which is an economical disadvantage.

(iv) When the rod-shaped base material is deposited and grown in the vertical direction, a rising gas stream due to the flame of the reaction burner flows to the porous portion of the upper part which is already formed, and has an adverse effect in the outer diameter and the distribution of the surface components of the porous portion.

SUMMARY OF THE INVENTION

Accordingly, a primary object of this invention is to provide a method of and apparatus for fabricating an optical glass base material which can eliminate the problems and drawbacks described in the above paragraphs (i) and (ii) as well as can provide embodiments which has solved the problems and drawbacks described in the above paragraphs (iii) and (iv).

The above and other related objects and features of the invention will be apparent from a reading of the following description of the disclosure and in the accompanying drawings and the novelty thereof pointed out in the appended claims.

DESCRIPTION OF THE PREFERRED EMBODIMENTS

Embodiments of a method and apparatus for fabricating an optical glass base material of the present invention will now be described in more detail with reference to the accompanying drawings.

Figure 1:
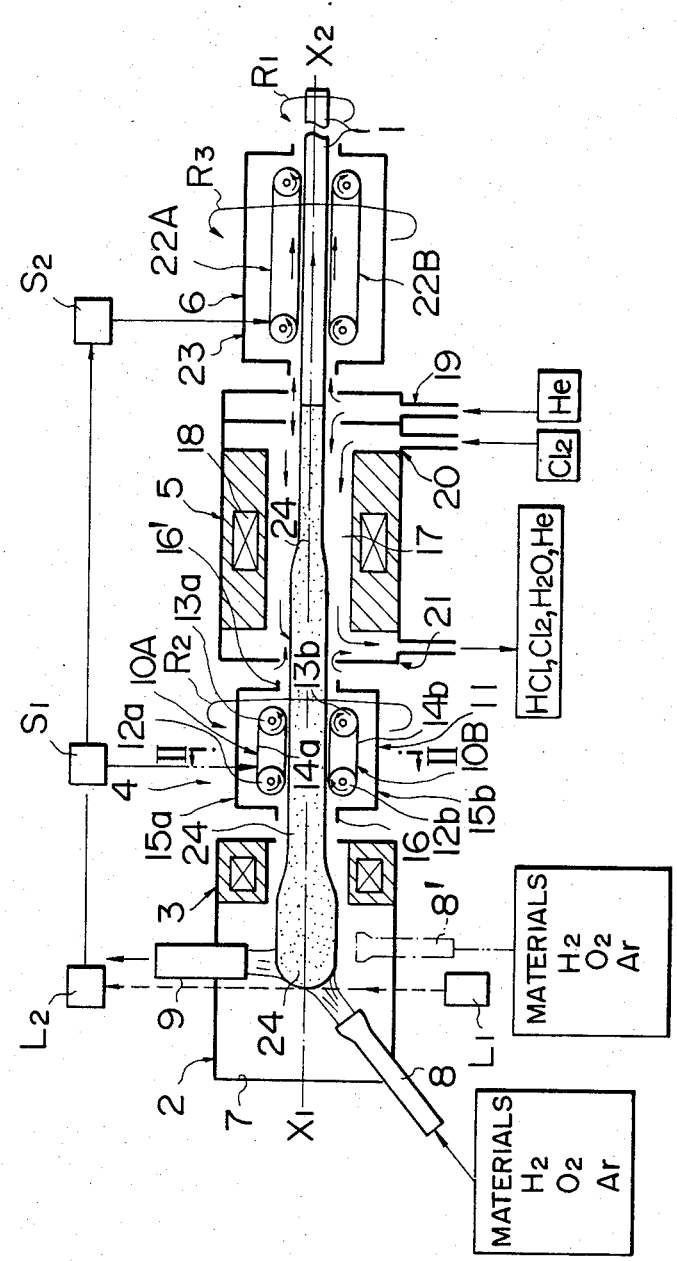
FIG. 1 is an explanatory view schematically showing an embodiment of a method of and apparatus for fabricating an optical glass base material according to the present invention.

In an embodiment of the invention in FIG. 1, reference numeral 1 designates a target, numeral 2 designates a glass fine particle generator, numeral 3 designates a heat treating machine for sintering a base material, numeral 4 designates a base material supporting machine, numeral 5 designates a second heat treating machine for sintering the base material, and numeral 6 designates a drawing machine.

In the apparatus thus constructed as described above, the target 1 is provided to be reciprocated along a horizontally movable axis $X_1$-$X_2$ shown in FIG. 1 and to be rotatable in a direction of an arrow $R_1$ in FIG. 1. The aforementioned machines are respectively disposed on the movable axis $X_1$-$X_2$ in the order of the fine glass particle generator 2, the heat treating machine 3, the base material supporting machine 4, the heat treating machine 5 and the drawing machine 6.

The fine glass particle generator 2 has a transparent and refractory reaction vessel 7, a reaction burner 8 of a multi-wall tube structure inserted at the end thereof into the reaction vessel 7, and an exhaust tube 9 provided at the reaction vessel 7. Vapor-phase glass stock, oxygen gas, hydrogen gas and buffer gas are supplied to the reaction burner 8.

The heat treating machine 3 is composed of a ring-shaped electric furnace such as a carbon resistance furnace or a siliconit (trade name of silicon carbide refractory material) furnace, and mounted at an entrance exit of the reaction vessel 7.

On the other hand, the base material supporting machine 4 has a pair of upper and lower internal rotors 10A, 10B, and an external rotor 11 which contains the rotors 10A, 10B.

Figure 2:
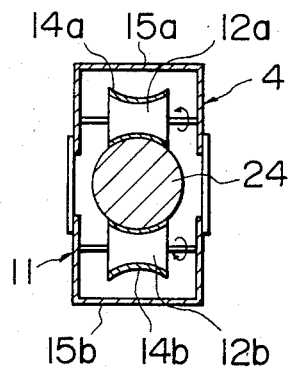
FIG. 2 is a sectional view taken along the line II—II in FIG. 1.

The internal rotors 10A, 10B are formed, as shown in FIGS. 1 and 2, of concave rollers 12a, 13a, 12b, 13b and endless belts 14a, 14b engaged over the rollers 12a, 13a, 12b, 13b. The recess rollers 12a, 13a, 12b, 13b are respectively rotatably journaled in frames 15a, 15b which form the external rotor 11.

The external rotor 11 is constructed so that a pair of the frames 15a, 15b are connected to each other at a predetermined opposed interval, hollow shafts 16, 16' are provided at both longitudinal ends, supported by bearings, not shown, and a rotary force of the direction of an arrow $R_2$ in FIG. 1 is applied to either one of the shafts 16, 16' through means such as a belt transmission, chain transmission, gear transmission.

On the other hand, the heat treating machine 5 is composed of a hollow passage 17 and a cylindrical electric furnace 18 provided on the outer periphery of the passage 17.

Gas supplying units 19, 20 for respectively supplying inert gas (e.g., He) and chlorine gas ($Cl_2$) are connected to the ends of the passage 17 at the side of the drawing machine 6, and an exhausting unit 21 is provided at the other end of the passage 17.

The electric furnace 18 is composed of the above-described carbon resistance furnace or the Siliconit furnace.

The drawing machine 6 is composed of internal rotors 22A, 22B, and an external rotor 23 which contains the rotors 22A, 22B. Since the construction of the drawing machine 6 is substantially the same as the base material supporting machine 4, the description will be omitted.

A power source for rotating the internal rotors 22A, 22B in a predetermined direction is provided in the drawing machine 6. Further, rotor transmitting means for rotating the external rotor 23 in a direction of an arrow $R_3$ in FIG. 3 is provided in the rotor 23.

In FIG. 1, reference character $L_1$ designates an emitting device for emitting a laser beam, and character $L_2$ designates a laser beam receptor. The emitting device $L_1$ and the receptor $L_2$ are disposed oppositely at a predetermined position of the glass fine particle generator 2 as a position sensor for detecting the glass fine particle deposited surface (grown surface) of the rod-shaped base material 24 which will be described in greater detail.

A speed controller $S_1$ of the internal rotors 10A, 10B is connected to the receptor $L_2$, and a speed controller $S_2$ of the internal rotors 22A, 22B is connected to the speed controller $S_1$.

The embodiment of the apparatus of the invention is constructed as described above, and when a method of fabricating an optical glass base material is executed by the apparatus hereinbefore described, the operation will be as follows:

In fabricating the optical glass base material, fine glass particles are first produced by the reaction burner 8 in the reaction vessel 7 of the fine glass particle generator 2, and, in this case, vapor-phase glass stock (main stock=$SiCl_2$, doping stock=$GeCl_2$, etc.), oxygen gas ($O_2$), hydrogen gas ($H_2$) and buffer gas (e.g., Ar) are supplied to the reaction burner 8, and the reaction burner B is operated in its combustion state to chemically react the glass stock.

The chemical reaction in this case is mainly a flame hydrolytic reaction, but may be a thermal decomposition reaction or oxidation reaction, and these reactions may be compositely conducted.

However, in any of these reactions, the products produced by these reactions are soot-like oxide powder such as $SiO_2$, $GeO_2$, and the oxide powder, i.e., glass fine particles thus produced are injected in a predetermined direction.

When the fine glass particles are produced in the reaction vessel 7 described, the target 1 is rotated in the direction of the row $R_1$, and the deposition side end of the target 1 corresponds to the fine particle injecting end of the reaction burner 8 in the reaction vessel 7.

Therefore, the fine glass particles injected from the reaction burner 8 are deposited on the end of the target 1, and porous rod-shaped base material 24 which are grown in a horizontal direction is formed on the end in this manner.

When the rod-shaped base material 24 is thus formed, the growing state on the base material growing surface is detected by the laser beam emitted from the emitting device $L_1$ to the receptor $L_2$, a detection signal from the receptor $L_2$ is inputted to the speed controller $S_1$, which suitably controls the rotating speeds of the internal rotors 10A, 10B in the base material supporting machine 4.

Therefore, the target 1 thus towed by the internal rotors 10A, 10B is moved synchronously with the growing velocity on the movable axis $X_1$-$X_2$ in a direction of $X_2$ as the rod-shaped base material 24 is grown, and the rod-shaped base material 24 of the grown state from the glass fine particle generator 2 side to the base material supporting machine 4 is thus moved at the controlled speed in the direction of $X_2$.

Thereafter, when the rod-shaped base material 24 is thus grown to a predetermined length, the base material 24 is passed through the heat treating machine 3. At this time, the rod-shaped base material 24 is sintered by the heat treating machine 3.

The sintering temperature at this time may be arbitrarily set. In this embodiment, the sintering temperature is, for example, set to a value lower than the transparent vitrification temperature (1400° C. to 1650° C.) of the base material.

Thus, the rod-shaped base material 24 thus sintered through the heat treating machine 3 is degassed to a predetermined degree due to the sintering to cause the volume of the degassed base material to be shrinked, thereby allowing the base material to be increased in hardness as compared with the porous state of the base material of the state before the sintering.

More particularly, the brittleness observed in the base material of the porous state can be eliminated in this case, and the strength of the base material which is not readily fractured can be obtained.

However, since the sintering temperature of the rod-shaped base material 24 by the heat treating machine 3 is lower than that of the transparent vitrification of the base material, the base material 24 is not transparently vitrified, but the sintering at this stage is not complete, but can be considered in semisintered state.

This semisintered state will be further described in more detail. The base material 24 of the semisintered state causes, for example, its density to be approximately 0.2 to 2.0 g/cc, and preferably approximately 0.3 to 0.5 g/cc as the base material is sintered at 1000° C. to 1300° C.

In order words, the density of the rod-shaped base material of the completely sintered state is 2.2 g/cc.

The semisintered state in this case may not, of course, always influence the entire rod-shaped base material, but as long as the desired strength of the rod-shaped base material 24 is obtained, only the outer periphery (surface layer) of the base material 24 may be semisintered, and the thickness (depth) of the semisintered layer from the outer peripheral surface side of the base material may be suitably set according to the heat treating temperature and the heat treating period of time.

The rod-shaped base material 24 thus strengthened in the mechanical strength by the semisintering as described is introduced into the second heat treating machine 5 through the base material supporting machine 4, and, at this time, the base material 24 is considerably grown in a horizontal direction.

When the rod-shaped base material of porous state is in general grown to this degree in a horizontal direction, the base material is damaged or broken in the prior art arrangement. However, the rod-shaped base material 24 thus strengthened in mechanical strength by the sintering method described is not damaged nor broken, and even if the length of the base material is thereafter further increased due to growth, the base material 24 is supported by means of the base material supporting machine 4, and the base material is accordingly not broken nor damaged.

The base material supporting machine 4 is operated so that the internal rotors 10A, 10B are endlessly rotated at a controlled speed along the base material moving direction, and to support the base material 24 in the state that the external rotor 11 of the housing of the rotors 10A, 10B is rotated in a direction of the arrow $R_2$, and, at this time, the rotors 10A, 10B make contact with the rod-shaped base material 24. Since the base material 24 is thus suitably strengthened in mechanical strength as described at this time, the base material is not damaged or deformed.

In the second heat treating machine 5, the passage 17 formed therein is heated to the temperature adapted for transparently vitrifying the base material through its electric furnace 18, inert gas (He) and chlorine gas ($Cl_2$) are further fed from the gas supplying units 19, 20 into the passage 17, and the rod-shaped base material 24 which has thus passed through the passage 17 of the heat treating machine 5 after being fed through the base supporting machine 4 is completely sintered and transparently vitrified and simultaneously degassed of OH group material contained therein, thereby providing a predetermined optical glass base material.

The rod-shaped base material 24 thus transparently vitrified as described is removed through the drawing machine 6 in which the rotors 22A, 22B are endlessly rotated in the moving direction of the base material and the external rotor 23 is rotated in a direction of the arrow $R_3$. The internal rotors 22A, 22B are suitably controlled as to their speed by the controller $S_2$ in view of the speeds of the internal rotors 10A, 10B controlled by the controller $S_1$ and the axial shrinkage amount of the rod-shaped material 24 which is radially and axially shrunk by the heat treatment through the heat treating machine 3.

More particularly, the internal rotors 22A, 22B are controlled as to their speed by the controller $S_1$ so that the tensile strength which causes the base material 24 to be damaged may not be applied between the internal rotors 10A, 10B of the base material supporting machine 4 and the internal rotors 22A, 22B of the drawing machine 6.

Then, the target 1 is cut from the rod-shaped base material 24 through a cutting machine, not shown, (including a fusion-cutting machine) disposed at the rear stage of the drawing machine 6, and the base material 24 is then cut in a desired length by the cutting machine.

In the embodiment described, the rod-shaped base material 24 is heat treated in the first heat treating machine 3 to obtain the sintered state (semisintered state) of a degree to produce the strength of the base material so as to reduce the remaining OH group of the material so that the base material 24 is transparently vitrified and then heat treated in the second heat treating machine 5 while degassing the work piece so as to completely transparently vitrify (completely sinter) the base material 24.

Since the OH group of the rod-shaped base material 24 thus transparently vitrified is removed as described, the optical fiber has good transmission characteristic when the optical fiber is produced from the rod-shaped base material.

The method and apparatus of the present invention is not limited to the particular embodiments described above. For example, the following modified embodiments may also be included in the scope of the present invention.

In the glass fine particle generator 2, the rod-shaped base material 24 in the porous state is deposited and formed through one reaction burner 8 in the embodiment described. However, the rod-shaped base material 24 in the porous state may be deposited and formed by the burner 8 together with another reaction burner 8' as shown in FIG. 1.

In this case, the reaction burner 8 is used for forming a core of the base material 24, and the reaction burner 8' is used for forming a cladding of the base material 24.

The reaction burners 8, 8' may also be changed by the following means:

In one of them, liquid-phase glass stock is, for example, formed in a fog state by a nebulizer such as, for example, a supersonic nebulizer, or a paper nebulizer, injected to the target, and formed in soot-like glass fine particles (glass oxide powder) by heating the foggy stock by a heater at the end of the nebulizer (in the vicinity of a spraying port) at the injecting time.

In the other, soot-like glass fine particles are produced in advance, the glass fine particles are injected toward the target through a powder injector, and thermal adhesiveness is provided at the depositing time by heating the fine glass particles by a heater at the end of a powder injector at the injecting time.

In the heat treating machine 3, the rod-shaped base material 24 in the porous state deposited on the target 1 is semisintered by the heat treating machine 3 in the embodiment described. However, the rod-shaped base material 24 may be instantaneously completely sintered (transparently vitrified) through the heat treating machine 3.

In this case, OH group remains in the rod-shaped base material 24 thus transparently vitrified, but the radiation deterioration of the radiation resistant optical fiber can be reduced due to the presence of the remaining OH group, and when the base material for the radiation resistant optical fiber is obtained, the rod-shaped base material is preferably instantaneously transparently vitrified as described.

Further, the fine glass particles from the burner may be deposited by heating in the semisintered state.

In the base material supporting machine 4, the endless belts 14a, 14b are respectively engaged with the concave rollers 12a, 13a, 12b, 13b which form the internal rotors 10A, 10B in the embodiment described. However, the endless belts 14a, 14b may be omitted. Further, when the endless belts are omitted, a slidable film of fluorine resin (e.g., Teflon of trade name) may be formed on the peripheral surfaces of the rollers 12a, 13a, 12b, 13b.

In this case, the concave rollers may consist of 3 pairs or more in number, and may also use either a pair of the rollers 12a, 12b and 13a, 13b.

Figure 3A:
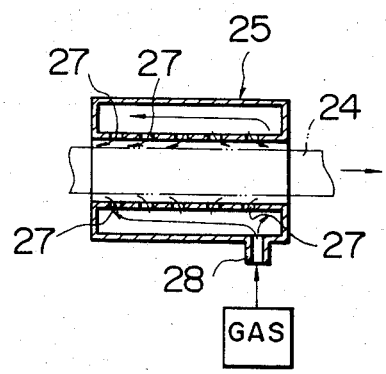
FIGS. 3(a) and 3(b) are sectional views showing other embodiments of base material supporting means in the apparatus of the invention.
Figure 3B:
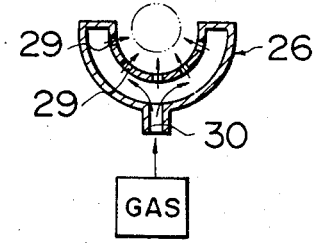

When the base material supporting machine 4 employs noncontact type, gas injectors 25, 26 may be provided as shown in FIGS. 3(a) and 3(b).

The gas injector 25 in FIG. 3(a) is formed in a double-wall cylindrical shape, a number of injection holes 27, 27, . . . are perforated in the inner peripheral surface of the injector, and a gas supply port 28 is provided at the outer peripheral surface.

The gas injector 26 in FIG. 3(b) is formed in a double-wall split cylindrical shape, and, in case of this injection 26, a number of injecting holes 29, 29, . . . are perforated in the inner peripheral surface, and a gas supply port 30 is formed at the outer peripheral surface.

When the base material supporting machine 4 is formed of the gas injectors 25, 26 as described, gas such as inert gas supplied from the gas supply ports 28, 30 into the double-wall space thereof may be injected from the gas injecting holes 27, 27, . . . and 29, 29, . . . , so as floating to support the rod-shaped base material 24 by floating the material.

In this case, the gas to be injected such as inert gas may be at ambient temperature, by may also be heated to a predetermined temperature.

In addition, when a predetermined rod-shaped base material is fabricated in a suitable combination of the various described means, the glass fine particles may be deposited and grown in an oblique direction to form the base material, and, in this case, the movable axis $X_1$-$X_2$ of the target 1 may be set at an intersection angle less than 90° to the horizontal axis, and preferably less than 45° thereto.

The movable axis $X_1$-$X_2$ may be set to a vertical state.

Another embodiment of the present invention will now be described with reference to FIG. 4.

Figure 4:
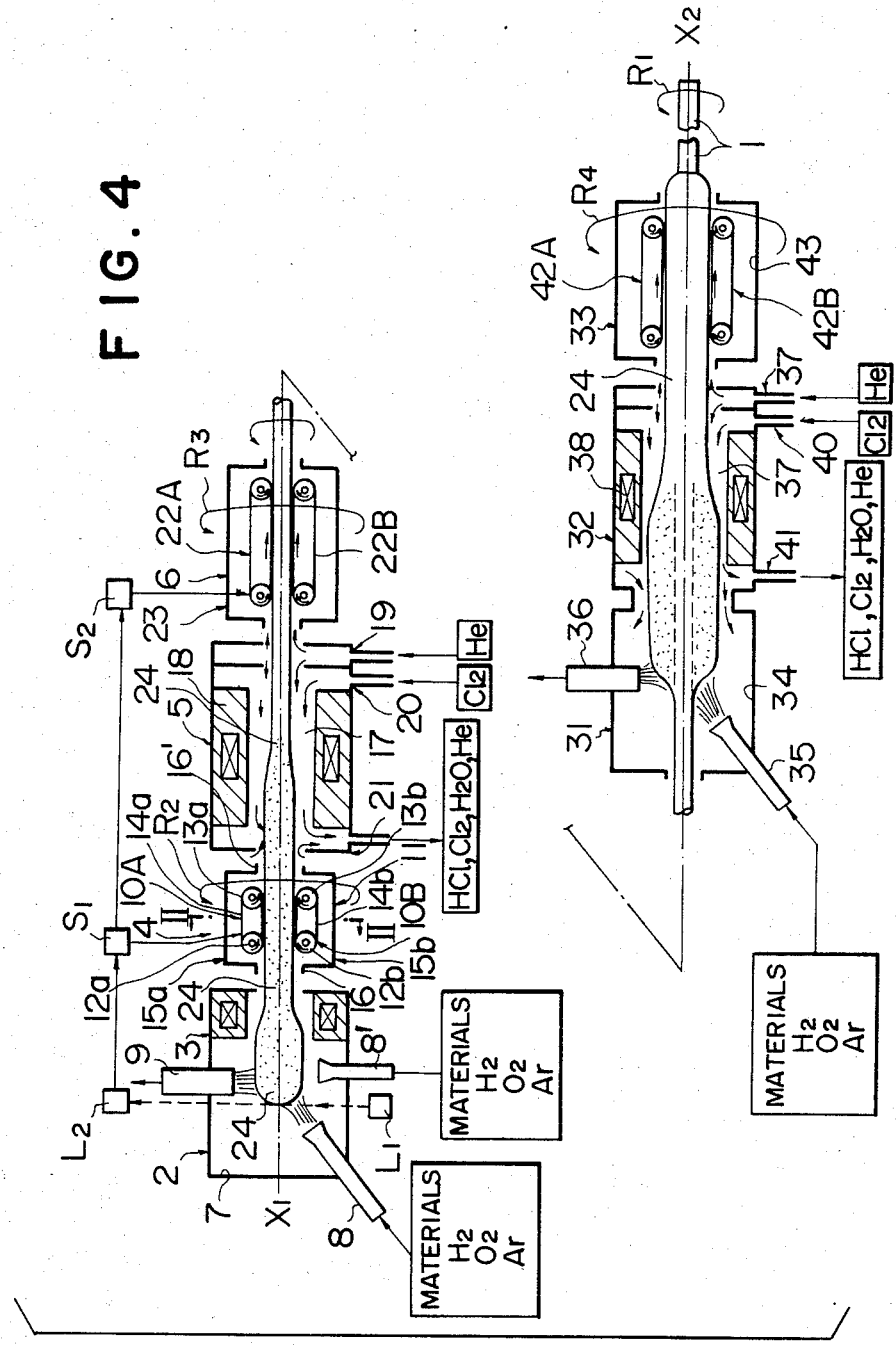
FIG. 4 is an explanatory view schematically showing another embodiment of a method and apparatus according to the invention.

In the embodiment in FIG. 4, transparently vitrified rod-shaped base material 24 is formed by the same method and apparatus as those described with respect to FIGS. 1 to 3, and, then, a porous glass layer is formed on the outer periphery of the rod-shaped base material 24, and further, the porous glass layer is then transparently vitrified.

In this case, a second fine glass particle generator 31, a third heat treating machine 32, and a second drawing machine 33 are sequentially arranged at the rear stage of the drawing machine 6 along the movable axis $X_1$-$X_2$ as shown in FIG. 4.

The glass fine particle generator 31 is constructed to have a reaction vessel 34, a reaction burner connected to a gas supplying units with, and an exhaust tube 35 connected to an exhaust unit in the same manner as the above-described fine glass particle generator 3.

The third heat treating machine 32 is constructed to have a hollow passage 37 and a cylindrical electric furnace 38 provided on the outer periphery of the passage 37 as well as predetermined gas supplying units 39, 40 and an exhausting unit 41 in the same manner as the second heat treating machine 5 hereinbefore described.

The fine glass particle generators 3, 32 are connected to each other as shown in FIG. 4.

Further, the second drawing machine 33 is constructed in the same manner as the drawing machine 6, the machine 33 has internal rotors 42A, 42B, and an external rotor 43 which contains the rotors 42A, 42B as well as a power source for rotating the rotors 42A, 42B in a predetermined direction in the rotors 42A, 42B, and rotation transmitting means for rotating the rotor 42 in a direction of an arrow $R_4$ in FIG. 4 in the rotor 43.

When the apparatus of the second embodiment thus constructed is operated, the rod-shaped base material 24 completely transparently vitrified and passed through the drawing machine 6 is introduced into the fine glass particle generator 31, the production of fine glass particles is carried out through the reaction burner 35 by supplying gas-phase stock, oxygen and hydrogen in the reaction vessel 34 of the machine 31, and a porous glass layer 44 is formed by depositing the fine particles on the outer periphery of the rod-shaped base material thus transparently vitrified as described above.

Then, the porous glass layer 44 is then heat treated in the same manner as the heat treating machine 5 through the heat treating machine 32 at the rear stage of the glass fine particle generator 31, and is thus transparently vitrified.

Thus, newly transparently vitrified layer is deposited and formed to increase the diameter of the rod-shaped base material 24, thereby providing a large-sized rod-shaped base material 24.

The large-sized rod-shaped base material 24 is drawn by the drawing machine 33 which has the same functions as the drawing machine 6, and cutting of the target and the cutting of the base material are carried out by the means described.

The base material thus produced is thermally oriented by general spinning means through a ring-shaped electric spinning furnace to become optical fibers. When a spinning furnace having orienting means is, for example, disposed laterally at the rear stage of the drawing machine 33 in FIG. 4 in the method and apparatus described, the fabrication of the base material to the fabrication of the optical fiber can be completely performed in series of steps.

According to the present invention as described there is provided a method of fabricating an optical glass base material by injecting and depositing glass fine particles produced by chemically reacting glass stock which comprises means for growing the glass fine particles in a depositing direction to form porous rod-shaped base material, support means for supporting the porous rod-shaped base material after growing, and heat treatment means for sintering at least the outer periphery of the rod-shaped base material in semisintering state before supporting the rod-shaped base material by said support means to harden the same.

Therefore, since the rod-shaped base material is held in the stable state through the support means, the base material is strengthened in mechanical strength by a semisintering hardening stage through the heat treating means before being supported by the support means, the base material is not deformed nor damaged in the supported state, and the large base material may be fabricated.

Even if the length of one base material is considerably increased when the glass fine particles are deposited in a horizontal direction or in an oblique direction as in the embodiments described, the degree of the base material occupying in the elevational direction is shortened as compared with the conventional vertical direction type, the high costs of the respective means can be avoided, and combining of the steps in fabricating the long base material and the handling may be facilitated, and a housing for carrying out the method need not be greatly increased as in the conventional arrangement.

Particularly in the horizontal deposition type, since the rising gas stream due to the reaction burner is not flowed to the rod-shaped base material side already formed, it does not effect the adverse influence due to the rising gas stream to the base material.

Since the apparatus of the invention is built so as to fabricate porous optical glass base material by growing glass fine particles produced by chemically reacting glass stock in a depositing direction and has a fine glass particle generator disposed at the input stage on movable axis in a longitudinal direction of a target, a base material supporting machine disposed at the output stage of the generator to be disposed opposite to the generator, and a heat treating machine disposed oppositely to the base material supporting machine at the position of the front stage of the base material supporting machine for sintering the base material, the method described may be rationally carried out.

We claim:

1. A method of fabricating an optical glass base material, comprising the steps of:
    (a) generating in an input zone, soot-like oxide powders from $SiO_2$ or $GeO_2$ raw material from a burning zone (8) so as to produce fine glass powders and injecting these powders in a predetermined direction along a rotating longitudinal travel path;
    (b) growing with these powders a rod-shaped base material workpiece (24) and detecting the formation of said workpiece by means of an emitted beam to produce a control signal;
    (c) controlling the forward moving speed of the rod-shaped workpiece in response to the control signal;
    (d) passing said rod-shaped workpiece through a first heat treating zone to semi-sinter said workpiece, and simultaneously degassing the workpiece of OH components while reducing its volume; and,
    (e) introducing the semi-sintered workpiece to a second heat treating zone while supporting the workpiece so as to degas the workpiece and transparently vitrifying the workpiece while feeding an inert gas into this second heat treating zone.

2. A method as claimed in claim 1 wherein the semi-sintering temperature in the first heat treating zone is between about 1,000° to about 1,300° C.

3. A method as claimed in claim 2 wherein the temperature in the second heat treating zone is between about 1,400° and 1,600° C.

4. A method as claimed in claim 3 wherein said emitted beam is a laser beam.

5. A method as claimed in claim 4 including the further steps of drawing the workpiece produced in the second heat treating zone through a third heat treating zone with an input and an output side while introducing HCl, $Cl_2$, $H_2O$ and He to the input side while generating fine glass particles on said input so as to form a porous glass layer on the outer periphery of the workpiece to increase the diameter of the workpiece while at the same time introducing $Cl_2$ and He to the output side.

6. An apparatus for fabricating an optical glass base material comprising in combination:
    (a) a frame, defining a longitudinal travel path along which fine glass powders are directed to form a workpiece which is to travel along said travel path;
    (b) a defined input side to said apparatus including feeding means to feed fine glass raw material in soot-like form, and detection means to detect the formation of the workpiece, said input side being a first workstation;
    (c) belt and pulley support means, at a second workstation, disposed for receiving the workpiece from the first workstation;
    (d) heating means and rotating means at said second workstation to rotate and heat the workpiece, also gas feed means to feed $HCl_2$, $Cl_2$, $H_2O$, and He in the gas phase on the input side of the second workstation and also gas feed means to feed $Cl_2$, and He on the output side of the second workstation; and,
    (e) drawing means to draw out the workpiece from the second workstation.

7. An apparatus as claimed in claim 6 including a third workstation disposed for receiving the workpiece from the drawing means, said third workstation including gas feed means as provided in the second workstation, feeding means to feed fine glass raw material in soot-like form onto the workpiece, rotating means to rotate the workpiece passing through the third workstation and heating means in said third workstation, and, third workstation drawing means to withdraw the finished workpiece as a product.

* * * * *